INVENTOR.
Yoshiyo Wada
BY [signature]
ATTORNEY

INVENTOR
Yoshiyo Wada

BY [signature]

ATTORNEY

INVENTOR
Yoshiyo Wada

BY [signature]

ATTORNEY

INVENTOR.
*Yoshiyo Wada*
BY [signature]
*ATTORNEY*

United States Patent Office 3,423,541
Patented Jan. 21, 1969

3,423,541
TAPE TENSION CONTROL SYSTEM
Yoshiyo Wada, Kawasaki, Japan, assignor to Victor Company of Japan, Limited, Kanagawa-ken, Japan
Filed Oct. 28, 1964, Ser. No. 406,989
Claims priority, application Japan, Nov. 1, 1963, 38/58,920
U.S. Cl. 179—100.2 2 Claims
Int. Cl. G11b 15/43

ABSTRACT OF THE DISCLOSURE

A magnetic tape recording and playback device develops an error signal which varies as a function the signal read from the tape. That signal, in turn, depends upon the relative positions of the recorded track and the reproduction head which is then reading the track. A vacuum suction is applied against the tape to maintain its proper tension. The error signal causes the suction—and therefore the tape tension—to vary as a function of the reproduced signal. This variation in suction compensates for stretching or shrinking of the tape to maintain the proper spatial relationship between the head and recorded track.

This invention relates to a control system, and more particularly to a magnetic recording and reproducing system which eliminates the Venetian blind effect occurring in the reproduced pictures due to the distortion of the magnetic tape.

In some magnetic apparatus a magnetic head is arranged to scan a magnetic medium such as a magnetic tape. The magnetic head scans along a relatively long and oblique locus and one or more fields of signals of high frequency of the television image signal etc. After one magnetic head completes the scanning over one signal field of the image, a subsequent magnetic head takes its place and scans over the subsequent signal field of the image.

In this invention, the reproduced output signals are compared with an output signal representing the magnetic head switching point so as to detect an error output signal determined by the error of the displacement due to switching the magnetic heads. The error output signal is introduced into a pump controlling system to automatically adjust the vacuum pressure of the pump and the adjusted vacuum pressure is applied to the magnetic tape immediately before a guide drum which serves as a regenerating part of the magnetic record. Thus the vacuum pressure prevents any Venetian effect from occurring in the reproduced pictures due to the variation of conditions between the recording and the reproducing caused by any distortion of the recorded magnetic tape, the variation in expansion and shrinkage of the magnetic tape due to the variation in temperature of the guide drum and the intrusion of the magnetic tape into the air gap of the guide drum.

It is an object of this invention to provide a magnetic recording and reproducing system in which the Venetian blind effect is eliminated.

It is a further object of this invention to provide a magnetic recording and reproducing system in which the Venetian blind effect of the reproduced pictures is eliminated by detecting an error output signal determined by the error of the displacement due to switching the magnetic heads.

Figure 1:
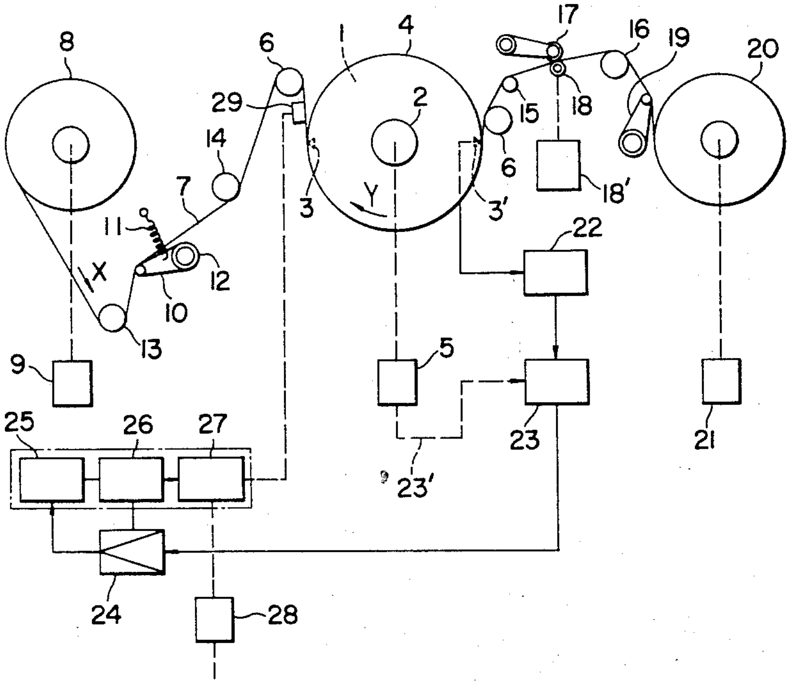
Figure 2:
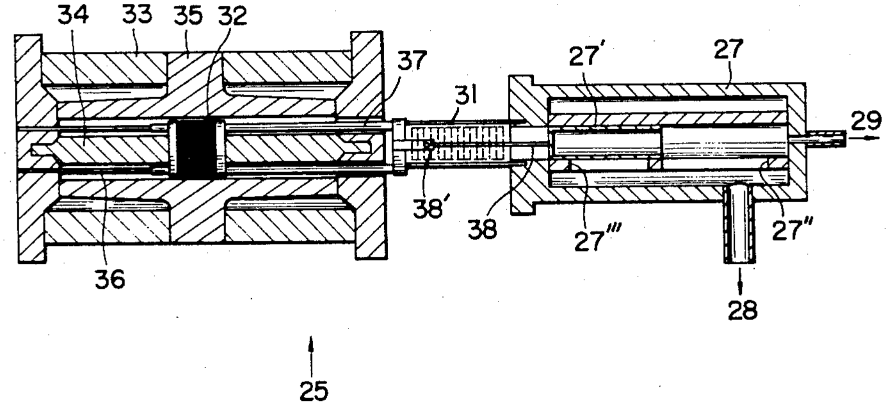
Figure 3A:
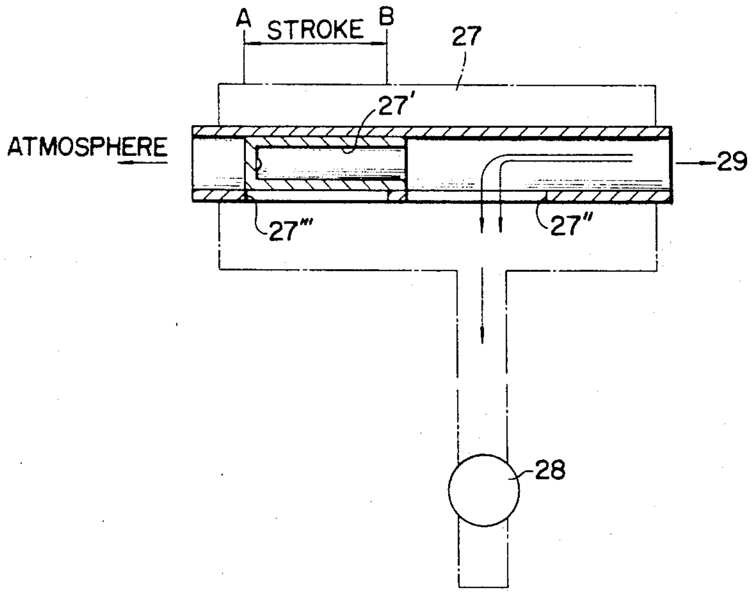
Figure 3B:
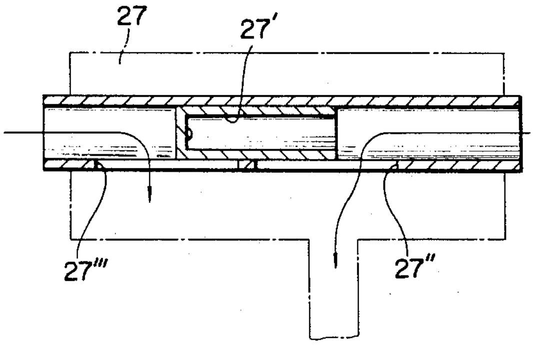
Figure 3C:
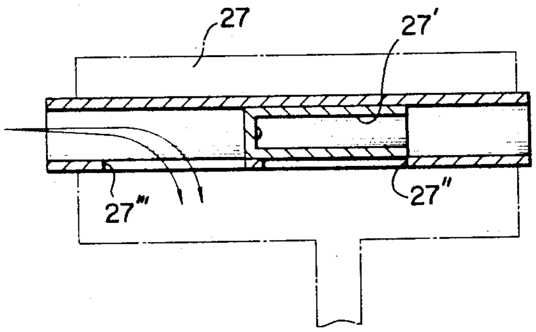
Figure 4:
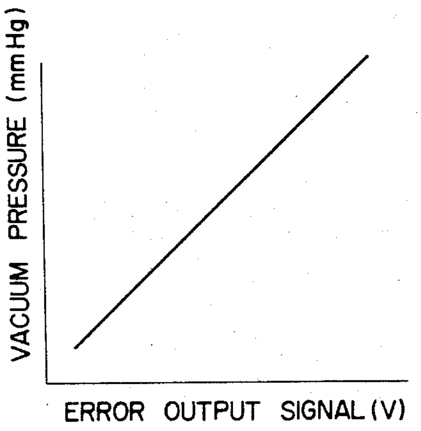
Figure 5:
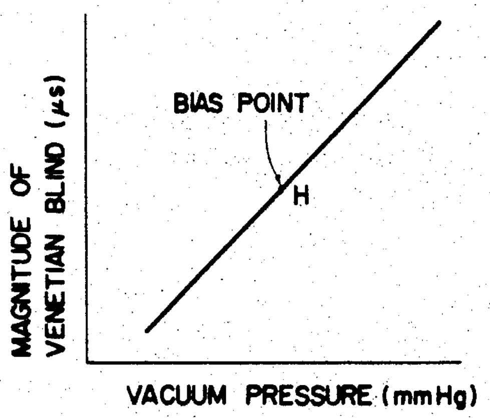
Figure 6:
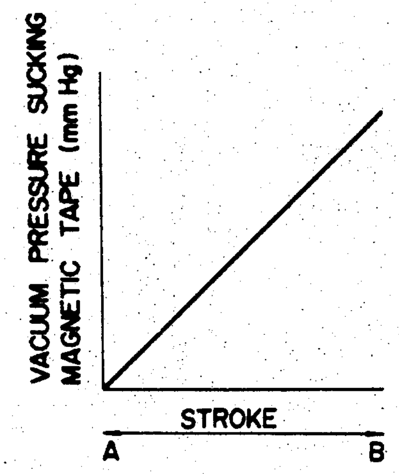
Figure 7:
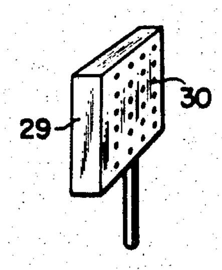

The objects and advantages of this invention will become readily apparent from the following detailed description, in which:

FIG. 1 is a system diagram of the magnetic recording and reproducing system provided in accordance with the invention, FIG. 2 shows a partially sectioned view of the essential part of an apparatus to which the magnetic recording and reproducing system is applied, FIGS. 3*a*, 3*b*, and 3*c* are stop motion views which explain in principle the driven status of the driving pipes of a pump chamber, FIG. 4 is a diagram explaining the relation between the error output signal and the vacuum pressure, FIG. 5 is a diagram explaining the relation between the magnitude of the Venetian blind generated and the vacuum pressure, FIG. 6 is a diagram explaining the relation between the stroke of the driving pipe in a pump chamber and the vacuum pressure sucking the magnetic tape, and FIG. 7 is a perspective view of an embodiment of a vacuum controlling element.

The magnetic recording and reproducing system provided in accordance with the invention is explained as follows: In FIG. 1 a rotating axis 2 provided in the center of rotating disc 1 is directly connected with an electrical motor 5 for driving the rotating disc. A pair of rotating heads 3 and 3' are provided on the periphery of the rotating disc, each head situating diametrically opposite and serving as a recording head or a reproducing head when the system is recording or reproducing. A guide drum 4 consists of the upper half, the lower half and the connecting part existing therebetween and the rotating disc is provided between the upper half of the guide drum and the lower half. A magnetic tape 7 is wound on rotating disc 1 and guide drum 4 by means of a pair of guide rollers 6 and 6'. The tape wraps over nearly half the circumference of the disc and the drum, and the magnetic tape is wound obliquely to the axis of the disc and the drum. The magnetic tape travels at a constant speed in the direction shown by an arrow X and the rotating disk rotates at a constant speed which is faster than the speed of the magnetic tape in the direction shown by an arrow Y. A reel motor 9 is directly connected with a tape supplying reel 8. A spring 11 is fixed to a tension arm 10 which rotates about an axis 12. The magnetic tape travels on guide rollers 13, 14, 15 and 16, a pinch roller 17 and a tension arm 19. A capstan 18 is driven by a capstan motor 18'. A reel motor 21 is directly connected with a tape taking up reel 20. A demodulator 22 engages with rotating magnetic head 3 or 3' when the system is reproducing. A detector 23 detects the error output signal determined by the displacement error due to switching of the rotating magnetic heads after comparing the reproduced signal obtained from the magnetic tape when the system is reproducing with an output signal 23' indicating the position to switch the magnetic head obtained from an apparatus such as a tone wheel. The reference numerals 24, 25, 26, 27, 28 and 29 are, respectively, a driving amplifier, a driving mechanism, a stroke control mechanism, a pump chamber, a vacuum pump and a vacuum controlling element. The pump chamber provides a sucking opening 27'' and a leak opening 27'''. A driving pipe 27' travels over the suction opening and the leak opening, as shown in FIGS. 3*a*, 3*b* and 3*c*. The vacuum control element provides a plurality of suction holes 30 on a side facing the magnetic tape which control the magnetic tape as shown in FIG. 7.

The recording operation of the system shown in FIG. 1 is explained as follows: When capstan 18 is driven by capstan motor 18' magnetic tape 7 wound on guide drum 4 travels in the direction shown by the arrow X. Rotating heads 3 and 3' and tape taking up reel 20 are driven respectively in the predetermined direction. Vacuum controlling element 29 is actuated to draw in magnetic tape with a predetermined vacuum suction hereinafter. When a recording signal is applied to the magnetic head the signal is recorded on the magnetic tape.

The reproducing operation of the signal recorded on the magnetic tape is explained as follows: The operation of the system when reproducing is the same as the operation of the system when recording except for the operation of the pump controlling system and the comparing detector, and therefore the operation of the system when reproducing is not explained precisely in point of that described above.

In short, magnetic tape 7 travels in the direction shown by the arrow X and rotating heads 3 and 3' rotate to scan the magnetic tape, then the signal recorded on the magnetic tape is reproduced by the rotating heads. When reproducing in the conventional system, heretofore, the magnetic tape may become deformed principally due to the expansion and shrinkage of the magnetic tape and the relation between the magnetic tape and the rotating heads is not the same as that when rotating heads operate to record. As a result, a Venetian blind effect is generated on the reproduced pictures to give worse reproduction.

In the invention, briefly speaking, in order to improve the worse reproduction described above, an error output signal is detected by comparing the reproduced signal obtained from the magnetic tape with an output signal indicating the position to switch the rotating magnetic heads and the error signal is introduced into the pump controlling system to control the pump chamber to adjust linearly the vacuum pressure to the error signal to automatically control the Venetian blind effect. The operation is explained in more detail hereinafter. The output signal reproduced from the magnetic tape obtained by the switching of the rotating magnetic heads is introduced into detector 23 and an output signal 23' indicating the position to switch the rotating magnetic heads generated by a tone wheel which operates with relation to motor 5 for driving rotating disc 1 is also introduced into detector 23. An error output signal determined by the displacement error due to switching of the rotating magnetic heads is detected by comparing the two output signals each other in the detector.

Driving mechanism 25 shown in FIG. 2 is explained in follows: A center yoke 34 having the S polarity faces yoke 35 having the N polarity. A magnetic circuit is formed in the air gap between center yoke 34 and yoke 35. The center yoke is inserted into a driving coil 32 and the driving coil is supported by a pair of slide tubes 37 to move on the guide bars. A cylindrical magnet 33 is mounted on yoke 35. A contact 38' connected directly with coil 32 by means of a pair of slide tube 37 slides on a potentiometer 31 in response to the movement of coil 32.

The operation of the driving mechanism is as follows: When the error output signal is applied to potentiometer 31 a current flows in coil 32 in response to the level of the error output signal and the coil is driven by the current according to the polarity of the current to move in the air gap in the left or right direction. Contact 38' slides on potentiometer 31 in response to the movement of coil 32. The relation of action between driving amplifier 24 and potentiometer 31 operates to make the current in coil 32 a balanced current in positive and negative directions. When the current in coil 32 becomes zero the coil stops at the point where the current becomes zero. This means that coil 32 moves on guide bars to assure a constant stroke in response to the level of the error input signal and therefore coil 32 operates as a control mechanism which varies the mechanical position thereof in compliance with the input signal. A driving pipe 27' of a pump chamber 27 in driving mechanism 25 is directly connected with coil 32 by means of slide tubes 37 and a connecting rod 38, and therefore, the driving pipe moves within the chamber in the driving mechanism to control the vacuum pressure in response to the movement of coil 32, as shown in FIGS. 3*a*, 3*b* and 3*c*. In FIG. 3*a*, leak opening 27''' is closed by driving pipe 27' and suction opening 27'' fully communicates with vacuum pump 28, in FIG. 3*b* sucking opening 27'' and leak openinng 27''' both partially commuicate with vacuum pump 28 and in FIG. 3*c* leak opening 27''' fully communicates with the vacuum pump 28 and leak opening 27'' is closed by driving pipe 27'. The vacuum pressure in vacuum controlling element 29 is varied in directly proportional to the error output signal as shown in FIG. 4 since the stroke of the driving pipe is directly proportional to the vacuum pressure coming from the vacuum pump. The vacuum pressure is applied to magnetic tape 7 immediately in front of guide drum 4 and the vacuum pressure applied to the magnetic tape in order to suck it is directly proportional to the stroke of driving pipe 27' as shown in FIG. 6.

The vacuum pressure applied to the magnetic tape can be adjusted in compliance with the Venetian blind generated from the magnetic tape as shown in FIG. 5. In FIG. 5 the nearly midpoint H of the straight line is set as the bias point and, in recording, the vacuum pressure at midpoint H is applied to the magnetic tape, while, in reproducing, the vacuum pressure adjusted around midpoint H is applied to the magnetic tape to therefore control the expansion and shrinkage of the tape. Thus the Venetian blind effect is automatically eliminated in the magnetic tape in accordance with this invention.

While a preferred embodiment of the present invention is disclosed, it is recognized that the scope of the present invention is not limited thereto and it is therefore intended that the scope of the present invention be defined by the appended claims.

What is claimed is:

1. A control system comprising means for reproducing high frequency signals from a magnetic medium, a plurality of magnetic recording and reproducing heads, means for pulling said medium by said heads for recording said signals in oblique loci on said magnetic medium, signal means for generating a signal representing the magnetic head switching position, detector means for detecting an error signal determined by the displacement of the reproduced signal at said magnetic head switching position by comparing said signal reproduced by said head with the output signal from said signal means, an automatically variable vacuum suction control system, control means for varying the vacuum suction in said suction control system in a linear relationship responsive to the magnitude of the output of said detector means, and suction means coupled to apply the vacuum suction in said pressure control system for drawing in said magnetic medium to drag against said pull and vary tension on said medium by an amount which varies as a function of said error signal.

2. A control system defined by claim 1 in which said vacuum suction control system comprises a driving coil supported on a pair of slide tubes which are slidable on a pair of guide bars, means for supplying a constant magnetic field, a potentiometer, the movable terminal of said potentiometer being connected with said slide tubes, and a vacuum chamber including an opening for applying the vacuum suction to means for drawing in the magnetic medium and an opening communicating with the atmosphere, and a driving valve device connected with said movable terminal and slidable over said both openings, said control means comprising means for controlling the position of said driving valve device by energizing said driving coil responsive to the output current of said detector means applied to said driving coil through said potentiometer.

References Cited

UNITED STATES PATENTS

| | | | |
|---|---|---|---|
| 2,750,961 | 6/1956 | Uritis | 179—100.2 |
| 3,213,193 | 10/1965 | Konishi | 179—100.2 |
| 3,231,668 | 1/1966 | Nischiwaki et al. | 179—100.2 |

BERNARD KONICK, *Primary Examiner.*

J. R. GOUDEAU, *Assistant Examiner.*

U.S. Cl. X.R.

137—625.5; 251—131